(12) United States Patent
Hikmet et al.

(10) Patent No.: US 10,317,045 B2
(45) Date of Patent: Jun. 11, 2019

(54) LIGHT EMITTING APPARATUS FOR EMITTING LIGHT OF VARIABLE SPECTRAL COMPOSITION USING MOVABLE ELEMENT

(71) Applicant: SIGNIFY HOLDING B.V., Eindhoven (NL)

(72) Inventors: Rifat Ata Mustafa Hikmet, Eindhoven (NL); Petrus Theodorus Jutte, Eindhoven (NL); Olexandr Valentynovych Vdovin, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/554,151

(22) PCT Filed: Feb. 12, 2016

(86) PCT No.: PCT/EP2016/052973
§ 371 (c)(1),
(2) Date: Aug. 28, 2017

(87) PCT Pub. No.: WO2016/139046
PCT Pub. Date: Sep. 9, 2016

(65) Prior Publication Data
US 2018/0038574 A1    Feb. 8, 2018

(30) Foreign Application Priority Data

Mar. 5, 2015    (EP) ..................................... 15157710

(51) Int. Cl.
*F21V 9/30*    (2018.01)
*G03B 21/20*    (2006.01)
(Continued)

(52) U.S. Cl.
CPC .................. *F21V 9/30* (2018.02); *F21K 9/61* (2016.08); *F21K 9/62* (2016.08); *F21S 41/125* (2018.01);
(Continued)

(58) Field of Classification Search
CPC ...... F21V 9/30; F21K 9/61; F21K 9/62; F21S 41/14; F21S 41/16; F21S 41/125;
(Continued)

(56) References Cited

U.S. PATENT DOCUMENTS

2012/0154767 A1    6/2012    Kimura et al.
2013/0100644 A1    4/2013    Hu et al.
(Continued)

FOREIGN PATENT DOCUMENTS

EP              2650593 A1      10/2013
WO       WO2014174560 A1      10/2014

*Primary Examiner* — Anh T Mai
*Assistant Examiner* — Hana S Featherly
(74) *Attorney, Agent, or Firm* — Akarsh P. Belagodu

(57) ABSTRACT

The present invention relates to a light emitting apparatus comprising, an element (104) arranged to convert light of a first wavelength (110) into light of a second wavelength (112), emit the light of the second wavelength (112), and to reflect light of the first wavelength (110), a reflector (106) arranged to reflect light of the first wavelength (110), and transmit light of the second wavelength (112), a light source (102) emitting light of the first wavelength (110) on the reflector (106) such that the reflected light of the first wavelength (110) is directed towards the element (104), a lens (108) arranged to focus light of the first wavelength (110) reflected by the reflector (106) onto the element (104), and to collect light emitted and reflected from the element (104), wherein the element (104) is arranged to emit light of the second wavelength (112) with an angular distribution (116) within a collection angle of the lens (108), wherein the element (104) is further arranged to reflect light of the first (Continued)

wavelength (110) with an angular distribution (118) substantially within the collection angle of the lens (108) and with an intensity distribution such that a portion (120) of the light of the first wavelength (110) that is reflected with an angular distribution outside a region (122) covered by the reflector (106) is larger than a portion (124) of the light of the first wavelength (110) that is reflected with an angular distribution within the region (122) covered by the reflector (106).

14 Claims, 3 Drawing Sheets

(51) Int. Cl.
| | |
|---|---|
| *F21K 9/61* | (2016.01) |
| *F21S 41/125* | (2018.01) |
| *F21S 41/14* | (2018.01) |
| *F21S 41/16* | (2018.01) |
| *F21K 9/62* | (2016.01) |
| *G02B 27/09* | (2006.01) |
| *G02B 27/42* | (2006.01) |
| *F21W 131/10* | (2006.01) |
| *F21W 131/406* | (2006.01) |
| *F21Y 115/30* | (2016.01) |
| *F21Y 115/10* | (2016.01) |
| *F21S 41/24* | (2018.01) |

(52) U.S. Cl.
CPC ............... *F21S 41/14* (2018.01); *F21S 41/16* (2018.01); *G02B 27/0944* (2013.01); *G02B 27/0955* (2013.01); *G02B 27/0977* (2013.01); *G02B 27/0994* (2013.01); *G02B 27/425* (2013.01); *G03B 21/204* (2013.01); *G03B 21/2066* (2013.01); *F21S 41/24* (2018.01); *F21W 2131/10* (2013.01); *F21W 2131/406* (2013.01); *F21Y 2115/10* (2016.08); *F21Y 2115/30* (2016.08); *G03B 21/208* (2013.01)

(58) Field of Classification Search
CPC . F21S 41/24; G02B 27/0944; G02B 27/0955; G02B 27/0977; G02B 27/0994; G02B 27/425; G03B 21/204; G03B 21/208; F21Y 2115/30; F21Y 2115/10; F21W 2131/10; F21W 2131/406
USPC .......................................................... 362/555
See application file for complete search history.

(56) References Cited

U.S. PATENT DOCUMENTS

| | | | |
|---|---|---|---|
| 2013/0250546 A1* | 9/2013 | Hu | ............................ F21V 9/40 362/84 |
| 2013/0329448 A1 | 12/2013 | Franz et al. | |
| 2014/0022512 A1 | 1/2014 | Li et al. | |

* cited by examiner

LIGHT EMITTING APPARATUS FOR EMITTING LIGHT OF VARIABLE SPECTRAL COMPOSITION USING MOVABLE ELEMENT

CROSS-REFERENCE TO PRIOR APPLICATIONS

This application is the U.S. National Phase application under 35 U.S.C. § 371 of International Application No. PCT/EP2016/052973, filed on Feb. 12, 2016, which claims the benefit of European Patent Application No. 15157710.3, filed on Mar. 5, 2015. These applications are hereby incorporated by reference herein.

FIELD OF THE INVENTION

The invention relates to a light emitting apparatus.

BACKGROUND OF THE INVENTION

High brightness sources for emitting light are interesting for various applications including spots, stage-lighting, headlamps and digital light projection. For this purpose, it is possible to make use of so-called light concentrators comprising a wavelength converting member converting light of a first wavelength to light of a second wavelength. Generally, the wavelength converting member converts a substantial portion of the light of a shorter wavelength to light with longer wavelengths. The wavelength converting member may further be shaped as a rod which is illuminated by a light source to produce light with a longer wavelength within the rod. Converted light is transported in the rod by for example total internal reflection and may be extracted from one of the sides of the rod which leads to an intensity gain in the converted light emitted from the rod. However, such a light concentrator based light source is rather inefficient and it is challenging to obtain high intensities needed for certain applications. It is challenging to tailor the spectral composition, also referred to as the color point, of the light emitted from the rod.

Alternatively, high intensity light with a desirable spectral distribution may be obtained by a system using a bright light source such as a light emitting diode, LED, or a laser where a high intensity light beam emitted by the light source is sent to a rotating wheel comprising a wavelength converting member such as a phosphor element. The amount of light from the light source that interacts with the wavelength converting member of the rotating wheel determines the spectral distribution of the light emitted. However, having a mechanical moving part reduces the reliability of the system.

SUMMARY OF THE INVENTION

It is an object of the present invention to overcome at least some of the above problems, and to provide light emitting apparatus with improved light output.

According to a one aspect of the invention, this and other objects are achieved by providing a light emitting apparatus. The light emitting apparatus comprises an element arranged to convert light of a first wavelength into light of a second wavelength, emit the light of the second wavelength, and to reflect light of the first wavelength, a reflector arranged to reflect light of the first wavelength, a light source emitting light of the first wavelength on the reflector such that the reflected light of the first wavelength is directed towards the element, a lens arranged to focus light of the first wavelength reflected by the reflector onto the element, and to collect light emitted and reflected from the element, wherein the element is arranged to emit light of the second wavelength with an angular distribution within a collection angle of the lens, wherein the element is further arranged to reflect light of the first wavelength with an angular distribution substantially within the collection angle of the lens and with an intensity distribution such that a portion of the light of the first wavelength that is reflected with an angular distribution outside a region covered by the reflector is larger than the portion of the light of the first wavelength that is reflected with an angular distribution within the region covered by the reflector.

An advantage resulting from that a portion of the light of the first wavelength is reflected with an angular distribution outside a region covered by the reflector is that the amount of light of the first wavelength blocked by the reflector is reduced. Hence, an increased light output from the light emitting apparatus is achieved.

Another advantage is that the spectral composition of the light emitted from the light emitting apparatus may be changed. In other words, the ratio of the light of the first wavelength and the second wavelength emitted from the light emitting apparatus may be set to a desired value by setting the amount of light of the first wavelength being reflected with an angular distribution outside a region covered by the reflector. The spectral composition, which may be described by a color point, of the light emitted from the light emitting apparatus may thereby be set to a desired value.

The reflector may be a dichroic reflector. The wording dichroic reflector should be understood as a reflector comprising a reflecting structure which is arranged to selectively pass light of a first wavelength while reflecting light of a second wavelength. The reflecting structure may comprise alternating layers of optical coatings with different refractive indexes to form an interference filter. The dichroic reflector may also be referred to as a dichroic filter, thin-film filter, or interference filter. Hence, the dichroic reflector may be understood as a color filter arranged to selectively pass light of a color while reflecting another color.

The reflector may be a diffractive grating.

The portion of the light of the first wavelength that is reflected with the angular distribution outside a region covered by the reflector may be at least 50% larger, or more preferably 70% larger, and even more preferably 90% larger than the portion of the light of the first wavelength that is reflected with the angular distribution within the region covered by the reflector. A substantial part of the light of the first wavelength may thereby be emitted from the light emitting apparatus increasing the light output from the light emitting apparatus.

The element may comprise a wavelength converting member and a reflecting member. The wavelength converting member is arranged to convert light of a first wavelength into light of a second wavelength and emit the light of the second wavelength. The reflecting member is arranged to reflect light of the first wavelength. Efficient light emission from the light emitting apparatus may thereby be obtained.

The element may further comprise a diffraction grating. The wording diffraction grating should be understood as an optical element having a periodic structure which may diffract a beam of light in a predetermined direction. Efficient redirection of light reflected and/or emitted by the element may thereby be obtained.

The reflecting member may comprise the diffraction grating. Light of the first wavelength which is reflected at the diffraction grating may thereby be reflected with an angular distribution outside a region covered by the reflector.

The reflecting member may comprise an inclined surface. The extension and angle of the inclined surface determine the amount of light of the first wavelength that is reflected, i.e. redirected, with an angular distribution outside the region covered by the reflector.

The reflecting member may comprise a scattering element. Efficient redirection of light reflected by the element may thereby be obtained. The reflecting member may also reflect light emitted by the element.

The wavelength converting member may have a front surface facing the lens, the front surface comprising a curved portion pointing outward from the front surface. Light of the first wavelength that is reflected at the front surface of the wavelength converting member may thereby be redirected such that an angular distribution is achieved outside the region covered by the reflector.

The wavelength converting member may comprise a scattering element. Efficient redirection of light reflected and/or emitted by the element may thereby be obtained.

The element may be movable within a focal plane of the lens. The amount of light of the first and the second wavelength that is respectively reflected or emitted from the light emitting apparatus may thereby be changed. By varying the position of the element in relation to the focal plane of the lens the ratio of the converted/reflected light in interaction with the different surface areas of the element that is illuminated may be changed. The spectral composition, in other words the color point, of the emitted light may thereby be changed without changing the etendue for the light emitted by the light emitting apparatus.

The light emitting apparatus may further comprise a mixing member arranged to mix light, originating from the element and being collected by the lens, such that light of the first wavelength and light of the second wavelength may be mixed within the mixing member. A light emitting apparatus emitting light having a spatially more uniform spectral distribution may therefore be achieved.

The mixing member may be an optical fiber.

The mixing member may be a transparent rod. The light emitting apparatus may further comprise an additional lens arranged to focus light, originating from the element and being collected by the lens, into the mixing member after the light has left the lens. A more efficient coupling of light into the mixing chamber may thereby be obtained.

The light source may be monochromatic.

The light source may comprise a laser diode and/or a light emitting diode, LED.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above and other aspects of the present invention will now be described in more detail, with reference to the appended drawings showing embodiments of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
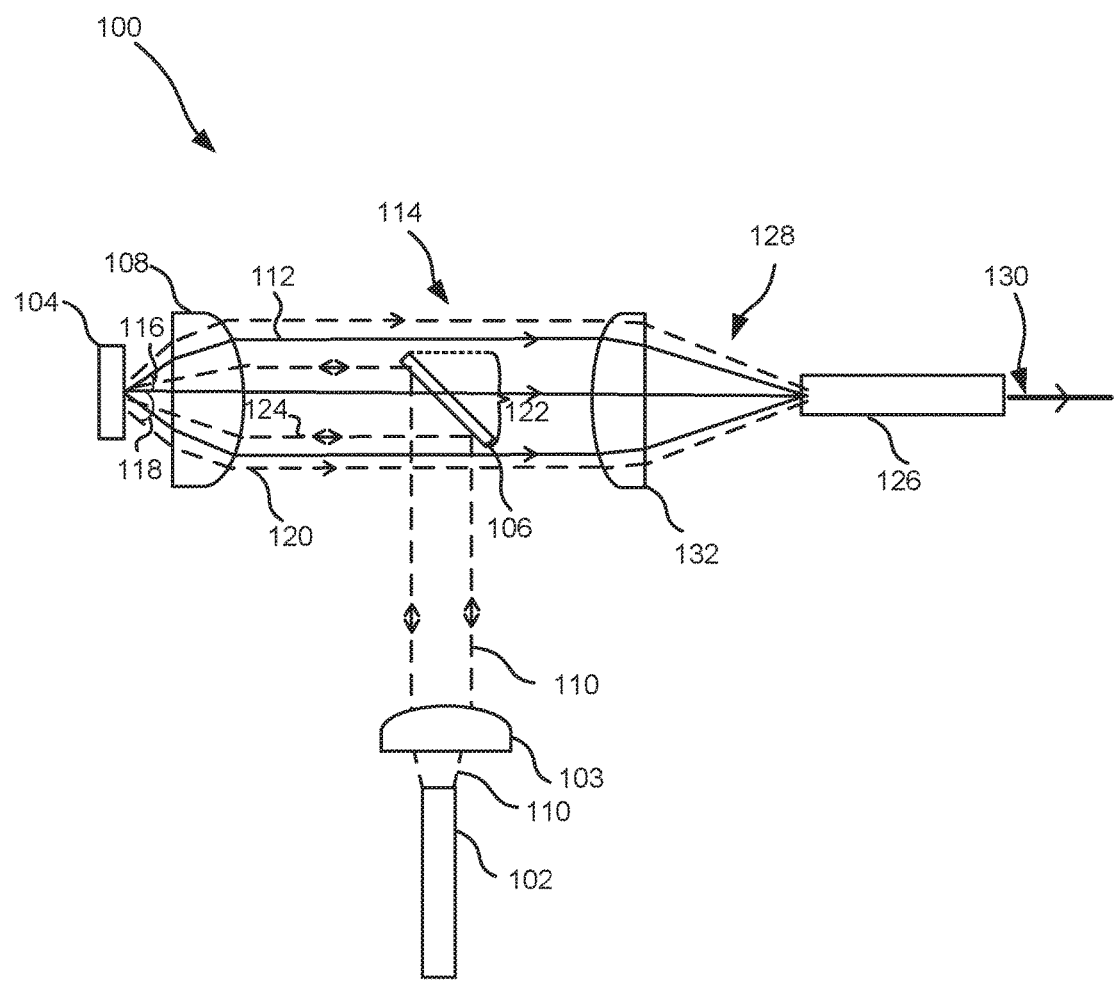
FIG. 1 illustrates a cross-sectional side view of a light emitting apparatus.

FIG. 1 illustrates a cross-sectional side view of a light emitting apparatus 100.

The light emitting apparatus 100 comprises a light source 102, an element 104, a reflector 106, and a lens 108. In the embodiments discussed in connection with FIGS. 1 to 4 the reflector is a dichroic reflector 106. However, the skilled person in the art realizes that the reflector may in other embodiments be a mirror or a diffractive grating.

The light source 102 is arranged to emit light of a first wavelength 110. A collimating lens 103 is arranged after the light source 102 to provide a collimated beam of light of the first wavelength on the dichroic reflector 106.

Alternatively, instead of using a lens, a collimating function can be achieved by a curved reflector such as a parabolic reflector. The light source may then be placed in a focus of the parabolic reflector.

The element 104 is arranged to convert light of the first wavelength 110 into light of a second wavelength 112. The element 104 is further arranged to emit the light of the second wavelength 112. The element 104 is further arranged to reflect light of the first wavelength 110. The dichroic reflector 106 is arranged to reflect light of the first wavelength 110. The dichroic reflector 106 is arranged to transmit light of the second wavelength 112.

In FIG. 1 illustrated light of the first wavelength 110 emitted from the light source 102 on the dichroic reflector 106 is reflected and directed towards the element 104. The lens 108 is arranged to focus light of the first wavelength 110 onto the element 104. The lens 108 is further arranged to collect light emitted and reflected from the element 104.

The lens 108 may be referred to as a collimating lens providing collimation of the light in the focus of the lens 108, i.e. substantially parallel rays 114 of light may leave the lens 108. The lens 103 and the lens 108 are here illustrated as piano-convex lenses but the skilled person in the art realizes that other lenses or mirrors and lens or mirror systems may be used.

The element 104 is arranged to emit light of the second wavelength 112 with an angular distribution 116 within a collection angle of the lens 108. Light of the second wavelength 112 may thereby be collected by the lens 108 and sent from the lens 108 as collimated light 114 such that light of the second wavelength 112 may be emitted from the light emitting apparatus 100.

The element 104 is further arranged to reflect light of the first wavelength 110 with an angular distribution 118 substantially within the collection angle of the lens 108. The element 104 is further arranged to reflect light of the first wavelength 110 with an intensity distribution such that a portion 120 of the light of the first wavelength 110 that is reflected with an angular distribution 118 outside a region 122 covered by the dichroic reflector 106 is larger than a portion 124 of the light of the first wavelength 110 that is reflected with an angular distribution within the region 122 covered by the dichroic reflector 106. The light emitting apparatus 100 may thereby provide an increased light output. By increasing the portion 120 of the light of the first wavelength 110 that is reflected with an angular distribution outside the region 122 covered by the dichroic reflector 106 more light of the first wavelength 110 may be emitted from the light emitting apparatus 100.

The ratio of the light of the first wavelength 110 and the second wavelength 112 emitted from the light emitting apparatus 100 determines the spectral distribution of the light emitted from the light emitting apparatus 100. In other words, the color point of the emitted light from the light emitting apparatus 100 may be set to a desired value by tailoring the portions 120 and 124 of light.

The light emitting apparatus 100 may comprise a mixing element 126. The mixing element 126 is arranged to mix light 128 entering the mixing element 126. The light 128 entering the mixing chamber originates from the element 104 and may comprise a spatially varying spectral composition, i.e. light of the first 110 and the second 112 wavelength may be separated in space. The light 128 that enters the mixing element 126 is mixed spatially by for instance multiple reflections and/or diffraction. The light 130 leaving the mixing element 126 may thereby have a spatially more uniform spectral distribution than the light 128 entering the mixing chamber 126. A light emitting apparatus 100 providing a spatially more uniform output of light may thereby be obtained.

The light source 102 may be monochromatic, for instance emitting blue light.

The light of the first wavelength 110 may be blue light and the light of the second wavelength 112 may have a longer wavelength than the first wavelength 110, such as yellow light. A combination of the blue and the yellow light may produce white light. By mixing the blue and the yellow light with the mixing element 126 the light emitting apparatus 100 may provide white light 130 with a more uniform spectral distribution. The white light emitted by the light emitting apparatus 100 may then be made to appear whiter, or otherwise with a different correlated color temperature, i.e. the light is less yellow in color by increasing the amount of blue light of the first wavelength 110.

More generally, the color point of the white light may be set to a predetermined value by adjusting the ratio of light of the first 110 and the second 112 wavelength.

The mixing member 126 may be an optical fiber. A simple, cost effective and flexible mixing member 126 may thereby be achieved. The light 128 entering the mixing element 126 may further propagate efficiently in the core of the optical fiber by total internal reflection.

The mixing member may alternatively be a transparent rod.

The cross-section of the rod or the optical fiber may be non-circular, for instance having a square, hexagonal or octagonal cross-section in order to improve light mixing.

The light emitting apparatus 100 may further comprise an additional lens 132 arranged to focus light originating from the element 104 and being collected by the additional lens 132 into the mixing member 126. A more efficient coupling of light into the mixing member 126 may thereby be obtained and an increased light output from the light emitting apparatus 100 may be achieved.

Figure 2:
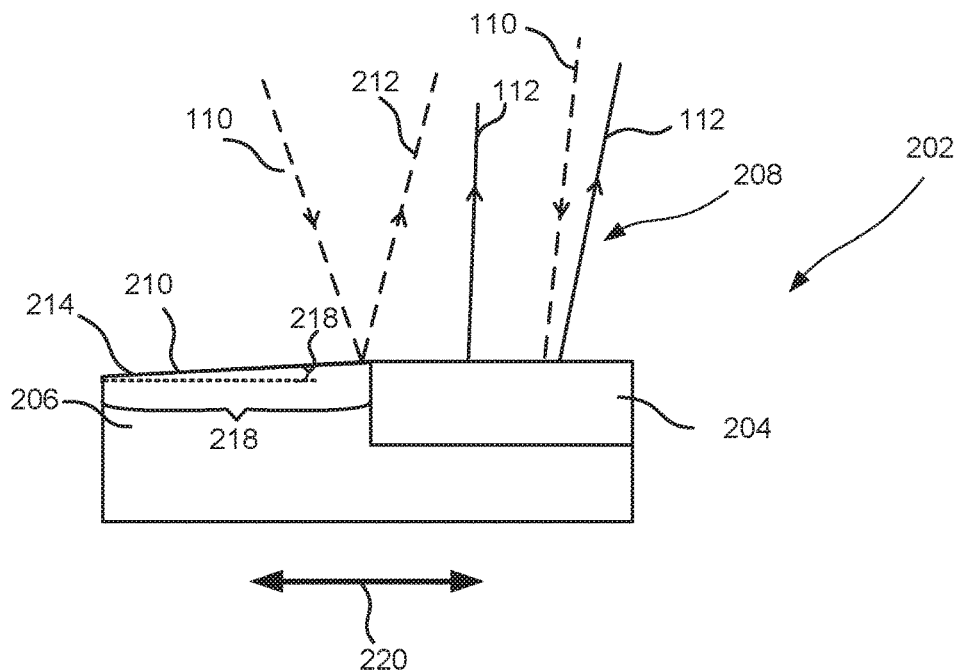
FIGS. 2-4 illustrate cross-sectional side views of elements of the light emitting apparatus.

FIG. 2 illustrates a cross-sectional side view of an element 202 suitable to be arranged within the light emitting apparatus 100. The element 202 comprises a wavelength converting member 204 and a reflecting member 206.

The wavelength converting member 204 is arranged to convert light of a first wavelength 110 into light of a second wavelength 112. The wavelength converting member 204 is further arranged to emit 208 the light of the second wavelength 112.

The reflecting member 206 comprises a reflecting surface 210. The reflecting member 206 is arranged to reflect light 212 of the first wavelength 110. Efficient redistributing of light is thereby achieved and the light emission from the light emitting apparatus may be increased.

The reflecting member 206 comprises an inclined surface 214. The extension 214 of the inclined surface 214 may determine the amount of light of the first wavelength 110 that is reflected 212, i.e. redirected. A larger extension may result in that a larger portion of the light of the first wavelength 110 that is focused on the element 202 is reflected by the inclined surface 214.

The angle 218, i.e. the inclination, of the inclined surface 214 determines the angular distribution at which light is reflected at the element 202. The angle 218 may be chosen such that the angular distribution of the light reflected 212 by the element 202 has an angular distribution which is outside the region covered by the dichroic reflector 106 of the light emitting apparatus 100.

For example, the angle 218 may be in the range of 25° to 75°, depending on the collection angle and focal length of the lens 108 or the extension of the dichroic reflector 106. It should be noted that the amount of light of the first wavelength 110 and the amount of light of the second wavelength 112 that is emitted 208 and/or reflected 212 by the element 202 depend on the amount of light of the first wavelength 110 that reach the wavelength converting member 204 and the reflecting member 206, respectively.

The element 202 may be movable 220 in relation to the lens 108. By varying the position of the element 202 in relation to the lens 108 the ratio of the converted/reflected light in interaction with the different surface areas of the element that is illuminated may be changed. For example, the larger portion of the light of the first wavelength 110 that reach the reflective surface 210 of the reflecting member 206, the larger is the amount of light of the first wavelength 110 that is reflected 212. As a result a larger amount of light of the first wavelength 110 may be emitted by the light emitting apparatus 100. The amount of light of the first 110 and the second 112 wavelength that is respectively reflected or emitted from the light emitting apparatus may thereby be changed by moving the element 202.

The element 202 may be combined with an off-axis position of the dichroic reflector with respect to the center of the beam in order to improve the collection efficiency of the first wavelength 110 further.

The element may alternatively be also made symmetric such that the wavelength converting member has in its adjacency reflecting members on both sides, both reflecting members having inclined surfaces for angular redistribution of the light being redirected. The element may further in this symmetric configuration be arranged in an on-axis position of the dichroic mirror.

Figure 3:
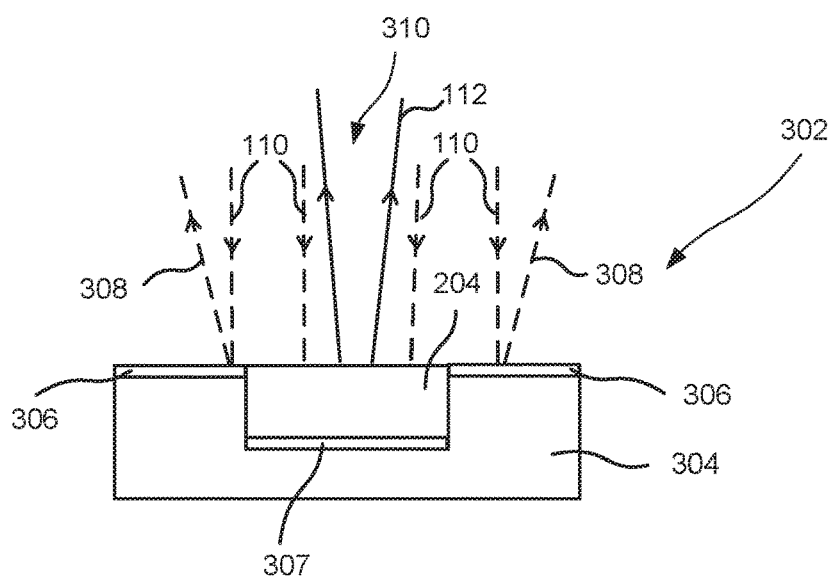

FIG. 3 illustrates a cross-sectional side view of an element 302 suitable to be arranged within the light emitting apparatus 100. The element 302 comprises a wavelength converting member 204 and a reflecting member 304.

The reflecting member 304 is shown to surround the wavelength converting member 204, but the reflecting member 304 may cover only a portion of the area surrounding the wavelength converting member 204.

The reflecting member 304 comprises a diffraction grating 306. Light of the first wavelength 110 which is reflected 308 at the diffraction grating may thereby be reflected with an angular distribution outside a region covered by the dichroic reflector 106. Efficient redirection of light reflected by the element may thereby be obtained.

The wavelength converting member 204 is arranged to convert light of a first wavelength 110 into light of a second wavelength 112 and emit 310 the light of the second wavelength 112. The diffraction grating 306 acts as the dispersive element and the direction of the reflected light depends on the angle at which the light is incident on the grating, on the grating period of the diffraction grating 306 and the wavelength of the incoming light, i.e. the first wavelength. It is known to the skilled person in the art to design a the diffraction angles of the diffraction grating as, for example, the relationship between the grating spacing and the angles of the incident and diffracted beams of light is known by the grating equation.

The diffraction grating 306 may be a blazed grating. The blazed grating is arranged to achieve increased reflection efficiency in a given diffraction order. In other words, improved light output may be achieved in a desired diffraction order while the residual light output in the other orders is reduced. The angular direction in which improved efficiency is achieved is given by the blaze angle, the wavelength at which the grating is optimized, i.e. blazed, and the given diffraction order. A proper design of the blazed grating may therefore improve the light reflectance of the element 302 in a given diffraction order such that light is efficiently reflected with an angular distribution outside a region covered by the dichroic reflector 106. An increased light output from the light emitting apparatus 106 is thereby achieved.

The element 302 may comprise a diffraction grating 307 arranged below the wavelength converting member. The diffraction grating 307 may be a blazed grating.

The diffraction grating 307 may reflect light of the first wavelength that has not been converted (not shown) by the wavelength converting member 204. The structure of the diffraction grating 307 is similar to the diffraction grating 306 and will for brevity not be discussed further. It should, however, be noted the wavelength of the light of the first wavelength 110 may shift when inside the wavelength converting member 204 due to a change in the refractive index. Hence, the gratings 306 and 307 may differ in their design, e.g. have different grating spacing and blaze angle.

It should be noted that the element 302 may comprise the diffraction grating 307 and/or the diffraction grating 306.

A top portion of the wavelength converting member 204 may be shaped into a diffraction grating (not shown) providing efficient reflection and redirection of a portion of light of the first wavelength that reach wavelength converting member 204. Hence, the wavelength converting member 204 may reflect a portion of the light of the first wavelength 110 and convert another portion of the light of the first wavelength 110 into light of the second wavelength 112. The intensity of light of the first wavelength leaving the wavelength converting member 204 is thereby increased.

The reflecting member may comprise a scattering element (not shown). Efficient redirection of light reflected by the element may thereby be obtained. The reflecting member may also reflect light emitted by the element.

The reflecting member may comprise optical micro-structures which may be arranged into periodic arrays. The individual optical micro-structures may have rotational symmetry resulting in a rotationally symmetric distribution of reflected light. The individual optical micro-structures may alternatively have lower symmetry, providing anisotropic angular distribution of reflected light. For instance, the optical micro-structures may be elongated in one direction and the reflected light may be directed mostly at angles outside the horizontal plane. This can be combined with an elongated reflector 106 located within the horizontal plane, thereby providing effective arrangement for the light of the first wavelength to be directed outside the collecting range of the reflector 106.

The reflecting member may comprise holographic optical elements.

The wavelength converting member may comprise a scattering element. Efficient redirection of light reflected and/or emitted by the element may thereby be obtained.

The scatting material may comprise particles, air inclusions or a structuring of the surface of the wavelength converting member and/or the reflecting member.

Figure 4:
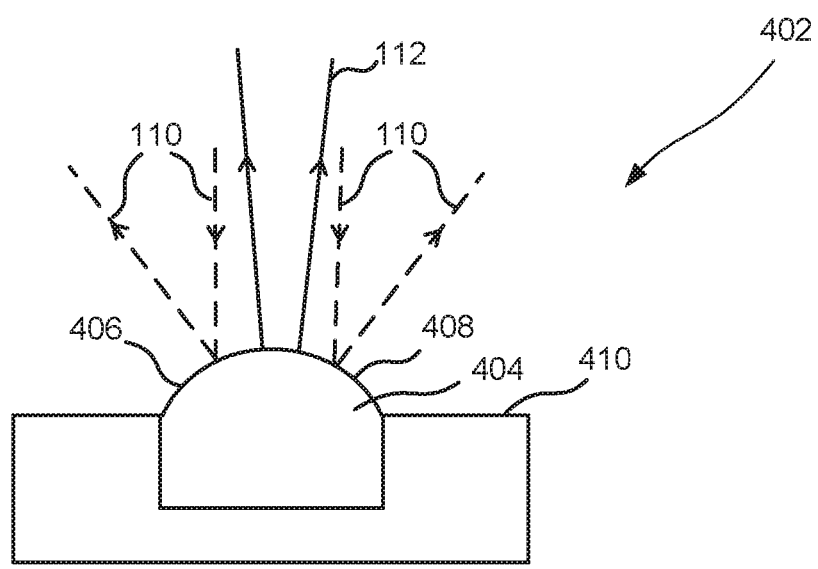

FIG. 4 illustrates a cross-sectional side view of an element 402 suitable to be arranged within the light emitting apparatus 100. The element 402 comprises a wavelength converting member 404 having a front surface 406 facing the lens 108. The front surface 406 comprises a curved portion 408 pointing outward from the front surface 406. Light of the first wavelength 110 that reach the front surface of the wavelength converting member may be reflected and thereby redirected with an angular distribution outside a region covered by the dichroic reflector 106. The curvature of the curved portion 408 determines the angles at which the light of the first wavelength are reflected. A larger curvature allows for a larger portion of the light of the first wavelength 110 that is incident on the wavelength converting member 404, to be efficiently reflected with an angular distribution outside a region covered by the dichroic reflector 106. An increased light output from the light emitting apparatus 100 may thereby be achieved. Preferred angles of redirection are in the range of 25° to 75°, depending on the collection angle and focal length of the lens 108 or the extension of the dichroic reflector 106.

The element 402 may further comprise a reflecting member 410. The features of the reflection member 410 have been described above. The curved portion 408 of element 402 may be coated with a semi-transparent wavelength selective optical mirror in order to balance the light of the first wavelength 110 that is transmitted and reflected by surface 408. Preferably the wavelength converting member may comprise a phosphor material such as a ceramic phosphor. The ceramic phosphor may be a Ce- or LU-doped YAC ceramic phosphor such as Lumiramic with high thermal conductivity Organic fluorescent dyes and quantum dots which are may also be considered for the purpose of the present invention.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide (CuInS2) and/or silver indium sulfide (AgInS2) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Obviously, the luminescent material may also be an inorganic phosphor. Examples of inorganic phosphor materials include, but are not limited to, cerium (Ce) doped YAG ($Y_3Al_5O_{12}$) or LuAG ($Lu_3Al_5O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3:Eu_x$ wherein $0<x\leq1$, preferably $0<x\leq0.2$; and BSSN being $Ba_{2-x-z}M_xSi_{5-y}Al_yN_{8-y}O_y:Eu_z$ wherein M represents Sr or Ca, $0\leq x\leq1$, $0\leq y\leq4$, and $0.00055\leq z\leq0.05$, and preferably $0\leq x\leq0.2$.

According to a preferred embodiment of the present invention, the luminescent material is essentially made of material selected from the group comprising (M<I>1-x-yM<II>xM<III>y)3(M<IV>1-zM<V>z)5O12- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0\leq x\leq1$, $0\leq y\leq0.1$, $0\leq z\leq1$, (M<I>1-x-yM<II>x, M<III>y)2O3- where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0\leq x\leq1$, $0\leq y\leq0.1$, (M<I>1-x-yM<II>xM<III>y)S1-zSez- where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0\leq x\leq0.01$, $0\leq y\leq0.05$, $0\leq z\leq1$, (M<I>1-x-yM<II>xM<III>y)O— where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0\leq x\leq0.1$, $0\leq y\leq0.1$, (M<I>2-xM<II>xM<III>2)O7- where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<=x<=1$, (M<I>1-xM<II>xM<III>1-yM<IV>y)O3- where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf; Zr, Ti, Ta, Nb or mixtures thereof, and M<IV> is selected from the group comprising Al, Ga, Sc, Si or mixtures thereof, and $0\leq x\leq0.1$, $0\leq y\leq0.1$, or mixtures thereof.

Particularly suitable luminescent materials, however, are Ce doped Yttrium aluminum garnet (YAG, $Y_3Al_5O_{12}$) and Lutetium-Aluminum-Garnet (LuAG).

Thermal conductivity of the phosphor ceramic is preferentially higher than 2 more preferentially more than 6 and most preferentially more than 20 $W \cdot m^{-1} \cdot K^{-1}$.

The reflecting member may comprise a specular- or diffuse-reflecting material such as aluminum or silver. The reflecting member may also comprise boron nitride or, aluminum oxide providing refection and improved thermal conductivity providing improved thermal management.

In the above description the reflector is disclosed as a dichroic reflector. The skilled person in the art realizes that the reflector may in other embodiments be a mirror or a diffractive grating.

The skilled person further realizes that the element may be arranged to emit and/or reflect light of the second wavelength with an angular distribution substantially within the collection angle of the lens and with an intensity distribution such that a portion of the light of the second wavelength that is emitted and/or reflected with an angular distribution outside a region covered by the reflector is larger than a portion of the light of the second wavelength that is emitted and/or reflected with an angular distribution within the region covered by the reflector.

The person skilled in the art realizes that the present invention by no means is limited to the preferred embodiments described above. On the contrary, many modifications and variations are possible within the scope of the appended claims. For example, the element may comprise a wavelength converting member having a front surface facing the lens, the front surface having a conical shape.

The reflecting member may reflect light of the second wavelength. Light of a first wavelength which is generated by the light source may be partly converted into light of a second wavelength by the wavelength converting member. The wavelength converting member may reflect light of the first wavelength.

A multilayer structure may be arranged below the wavelength converting member. It is thereby possible by multiple reflection and interference to increase the amount of light of the second wavelength that is reflected and redirected such that the light may be collected by the lens.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:
1. A light emitting apparatus comprising:
an element having a first top surface region arranged to receive light of a first wavelength, convert the light of the first wavelength into light of a second wavelength, and emit the light of the second wavelength, and a second top surface region arranged to reflect light of the first wavelength, the second top surface region being different from the first top surface region,
a reflector arranged to reflect light of the first wavelength, a light source arranged to emit light of the first wavelength on the reflector such that the reflected light of the first wavelength is directed towards the element, a lens arranged to focus light of the first wavelength reflected by the reflector onto the element, and to collect light emitted and reflected from the element, wherein the element is arranged to emit light of the second wavelength with an angular distribution within a collection angle of the lens, wherein the element is further arranged to reflect light of the first wavelength with an angular distribution substantially within the collection angle of the lens and with an intensity distribution such that a portion of the light of the first wavelength that is reflected with an angular distribution outside a region covered by the reflector is larger than a portion of the light of the first wavelength that is reflected with an angular distribution within the region covered by the reflector, wherein the element comprises a wavelength converting member and a reflecting member, and wherein the element is movable in relation to a focal plane of the lens.

2. The light emitting apparatus according to claim 1, wherein the portion of the light of the first wavelength that is reflected with the angular distribution outside a region covered by the reflector is one of at least 50% larger, or 70% larger, and 90% larger than the portion of the light of the first wavelength that is reflected with the angular distribution within the region covered by the reflector.

3. The light emitting apparatus according to claim 1, wherein the element further comprises a diffraction grating.

4. The light emitting apparatus according to claim 1, wherein the reflecting member comprises a diffraction grating.

5. The light emitting apparatus according to claim 1, wherein the reflecting member comprises an inclined surface.

6. The light emitting apparatus according to claim 1, wherein the reflecting member comprises a scattering element.

7. The light emitting apparatus according to claim 1, wherein the wavelength converting member has a front surface facing the lens, the front surface comprising a curved portion pointing outward from the front surface.

8. The light emitting apparatus according to claim 1, wherein the wavelength converting member comprises a scattering element.

9. The light emitting apparatus according to claim 1, wherein the light emitting apparatus further comprises a mixing member arranged to mix light, originating from the element and being collected by the lens, such that light of the first wavelength and light of the second wavelength are mixed within the mixing member.

10. The light emitting apparatus according to claim 9, wherein the mixing member comprises an optical fiber.

11. The light emitting apparatus according to claim 9, wherein the light emitting apparatus further comprises an additional lens arranged to focus light, originating from the element and being collected by the lens, into the mixing member after the light has left the lens.

12. The light emitting apparatus according to claims 1, wherein the light source is monochromatic.

13. The light emitting apparatus according to claims 1, wherein the light source comprises at least one of a laser diode and a light emitting diode.

14. The light emitting apparatus according to claim 1, wherein the element is movable within the focal plane of the lens so as to change a surface area of the element that receives or emits the light of the first and second wavelengths without changing an etendue of light emitted by the light emitting apparatus.

* * * * *